CHARLES W. SHATTUCK, OF FITCHBURG, MASSACHUSETTS.

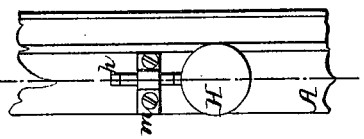
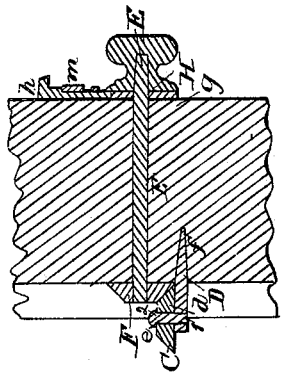
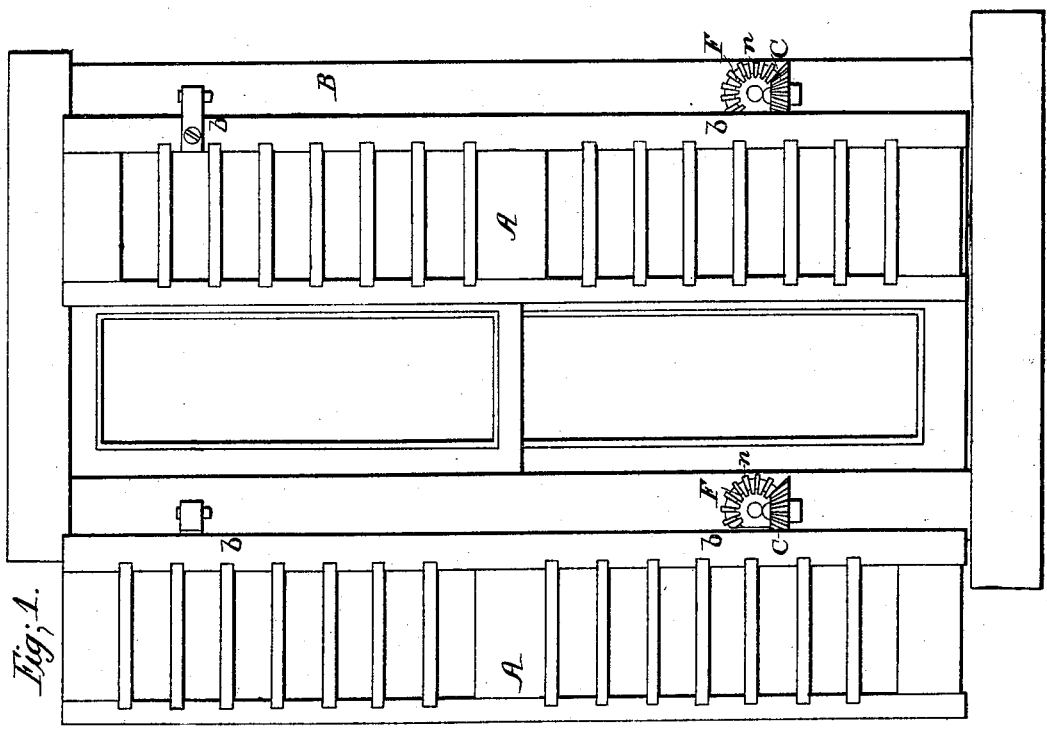

Letters Patent No. 86,946, dated February 16, 1869.

IMPROVEMENT IN SHUTTER-WORKER.

The Schedule referred to in these Letters Patent and making part of the same.

*Know all men by these presents:*

That I, CHARLES W. SHATTUCK, of Fitchburg, in the county of Worcester, and Commonwealth of Massachusetts, have invented certain new and useful Improvements in Devices for Opening, Closing, and Fastening, or Locking Blinds; and I do hereby declare that the following is a full, clear, and exact description of the same, reference being had to the accompanying drawings, forming a part of this specification, in which—

Figure 1 represents a front view of a window, the blind to which has my improvements applied thereto, one half of the blind being shown open, and the other half closed;

Figure 2 represents a top or plan view of one of the segment-gears employed;

Figure 3 represents an inside view of a section of the window-frame or jamb; and Figure 4 represents a section on line A B, fig. 3.

To enable those skilled in the art to which my invention belongs, to make and use the same, I will proceed to describe it more in detail.

In the drawings, the blind-sections A A are shown hinged, at their upper ends, to the building B, in the ordinary manner, while, at the bottom, they are provided with segment bevel-gears, C C, each gear having a screw, which is screwed into the edge, $b$, of the blind.

The gears C C have holes, $d$, through them, whereby they can be secured to the supporting-arms D D, by means of screws $e$.

The arms D, in this instance, are made with tapering ends, $f$, which are driven into the sides of the building, as indicated in fig. 4.

They may be made with a screw-thread on the tapering end, to screw in the sides of the building; or they may be made in a suitable form to be secured or fastened to the building by separate screws.

Holes are made in the outer ends of the blind-supports, and then tapped out, for the purpose of forming a screw-thread, to receive the screw-ends 1 of the screws $e$, as indicated in fig. 4 of the drawings.

The holes in the gears C are made large enough to permit them to turn freely, when the blind is opened and closed, without turning or moving the screws $e$.

The heads 2 of the screws prevent the blinds from rising up.

Shafts or spindles E are passed through holes in the sides of the building, and are fitted with bevel-gears F, to mesh into the segment-gears C, upon the blind-sections A A.

Upon the inside of the building, the spindles E are provided with knobs, H, and also with locking or holding-plates $g$, the latter being made with notches, to receive the sliding or locking-bolts $h$, which are held in place by the bands or guide-pieces $m$.

Plates $g$ should be provided with one notch, to hold the blind when closed, and another when opened, as shown in fig. 1, and, in addition thereto, may have several more intermediate notches, to hold the blind at any desired intermediate position.

In lieu of knobs H, cranks, or other means of operating or turning the spindles E from the inside of the building, may be employed.

The ends of the screws $a$ are placed in the moulds, in such a manner that, when the segment-gears C are cast, the metal runs around the ends of the screws $a$, thereby uniting the screws $a$ with the gears C in a secure and rigid manner, as indicated in fig. 2 of the accompanying drawings.

The gears F are made in segments, the same as the gears C, so that, when the blinds are closed, the flat parts of the gears abut against the edges of the blind-sections, while, when the blind-sections are opened, the gear part $n$ turns in back of the edges of the blind-sections, which are swung out from the side of the building.

By this arrangement, the blind-sections can be turned in close to the sides of the building when closed, and drawn up against the flat parts of the gears F, thereby preventing all clattering or jarring of the blinds.

The operation is as follows:

Sliding or locking-bolt $h$ is raised, and spindle E turned, to close or open the blind, as the case may be, after which bolt $h$ is allowed to drop into a notch in the plate $g$, and the blind becomes fastened in the position it occupies until bolt $h$ is raised again.

My improved device for opening, closing, and fastening the blind is very simple, compact, and not liable to get out of order, while the gears C are made to answer as parts of the lower hinges of the blind—a very important feature, since it reduces the cost very much, while, at the same time, securing a very strong lower hinge.

I am aware that gears have heretofore been employed to form at once the blind-hinge, and the means by which, in connection with a suitable spindle, or other device for operating them, the blind is opened and closed, and I do not claim broadly the employment of gears for such purpose; but What I do claim, and desire to secure by Letters Patent, is—

The segmental gears C and F, when constructed, arranged, and applied to the blinds and blind-support in the manner specified and shown.

CHARLES W. SHATTUCK.

Witnesses:
THOS. H. DODGE,
GEO. H. MILLER.